United States Patent [19]
DiRisio

[11] Patent Number: 6,049,679
[45] Date of Patent: Apr. 11, 2000

[54] ACTIVE LIGHT LOCKING CAMERA CLOSURE AND CAMERA

[75] Inventor: Anthony DiRisio, Rochester, N.Y.

[73] Assignee: Eastman Kodak Company, Rochester, N.Y.

[21] Appl. No.: 09/218,504

[22] Filed: Dec. 22, 1998

[51] Int. Cl.[7] .............................. G03B 17/02; G03B 17/26
[52] U.S. Cl. ........................... 396/538; 396/513; 396/516
[58] Field of Search ..................................... 396/511, 512, 396/513, 516, 535, 536, 538

[56] References Cited

U.S. PATENT DOCUMENTS

| 5,305,039 | 4/1994 | Dassero | 396/536 |
| 5,828,921 | 10/1998 | Miyawaki | 396/538 |

Primary Examiner—Safet Metjahic
Assistant Examiner—J. K. Han
Attorney, Agent, or Firm—Robert Luke Walker

[57] ABSTRACT

A camera includes an closure having a frame with a pair of opposed tracks. The frame defines a passage for the cartridge and placements for open and closed active light lock states. The closure has a door with a pair of opposed margins in slideable engagement with the tracks. The door is slideable along the tracks from a closed position, to a locking position, and then to an open position. The closure has a driver having an active light lock key. The driver is movable relative to the frame from a first position in which the key is in a placement for the open state and a second position wherein the key is in a placement for the closed state. The sliding of the door from the closed position to the locking position moves the driver from the first position to the second position. Sliding of the door from the locking position to the open position retains the driver in the second position.

16 Claims, 8 Drawing Sheets

ACTIVE LIGHT LOCKING CAMERA CLOSURE AND CAMERA

FIELD OF THE INVENTION

The invention relates to photography and more particularly relates to active light lock mechanisms and cameras and components including such mechanisms.

BACKGROUND OF THE INVENTION

APS film cartridges have an active light lock that closes the film entrance of the cartridge. With an unexposed film cartridge, the active light lock can only be opened in the dark, since the film cartridge is not light tight with the active light lock open. The active light lock once opened will remain in that state. This is problematic in one-time use cameras, since the active light lock must be closed both before the cartridge chamber is opened and light is allowed to enter.

It would thus be desirable to provide a camera and an improved camera closure which closes the active light lock when the closure is opened.

SUMMARY OF THE INVENTION

The invention is defined by the claims. The invention, in its broader aspects, provides an improved camera and improved camera closure which, during opening, first closes the active light lock, then admits light.

It is an advantageous effect of embodiments of the invention that a camera and closure are provided in which a frame has a pair of opposed tracks. The frame defines a passage for the cartridge and placements for open and closed active light lock states. The closure has a door with a pair of opposed margins in slideable engagement with the tracks. The door is slideable along the tracks from a closed position, to an locking position, and then to an open position. The closure has a driver having an active light lock key. The driver is movable relative to the frame from a first position in which the key is in a placement for the open state and a second position wherein the key is in a placement for the closed state. The sliding of the door from the closed position to the locking position moves the driver from the first position to the second position. Sliding of the door from the locking position to the open position retains the driver in the second position.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
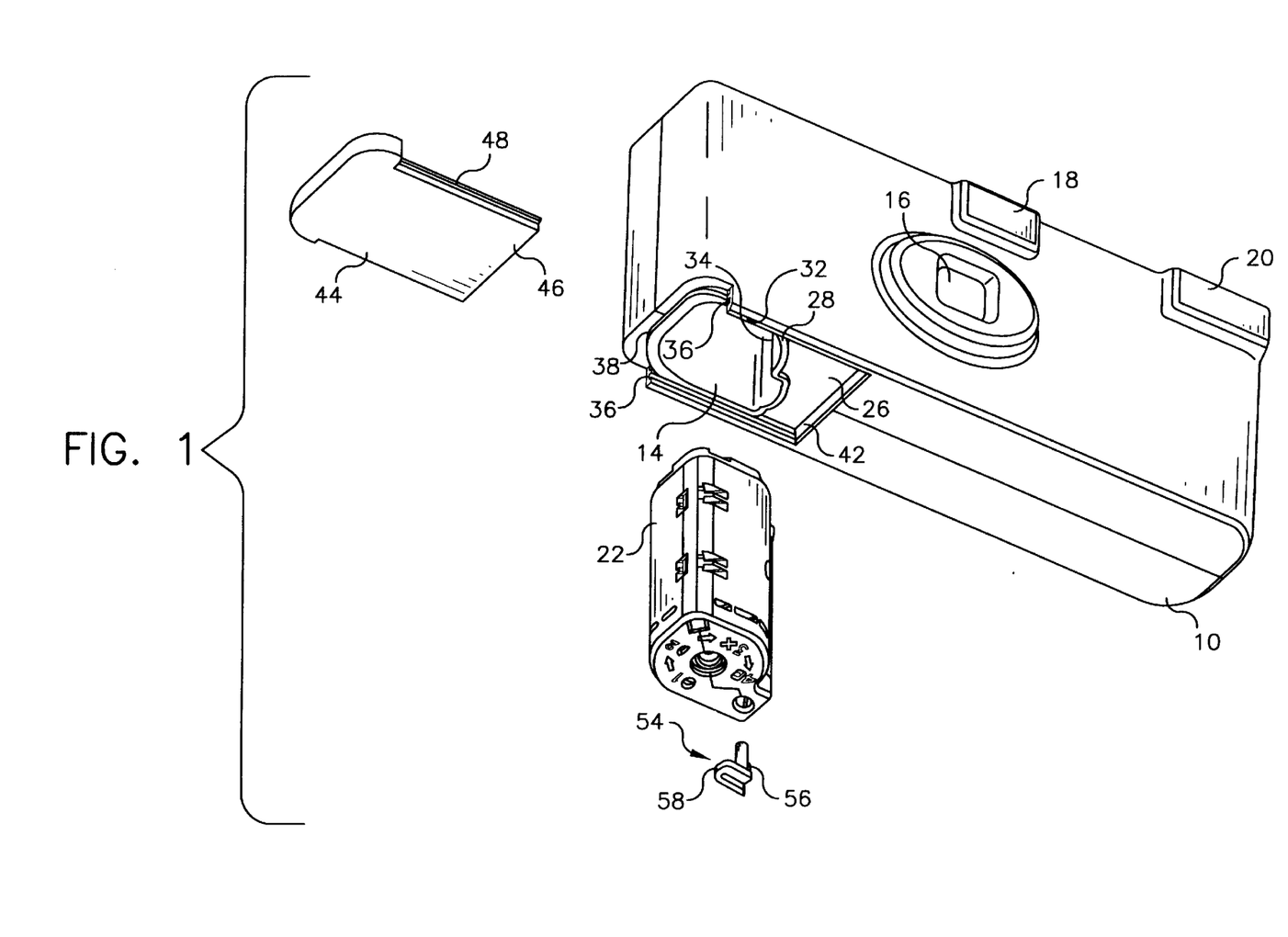
FIG. 1 is bottom perspective view of an embodiment of the camera. The door is in the open position. The cartridge is removed from the camera and the driver is also displaced from the camera.
Figure 2:
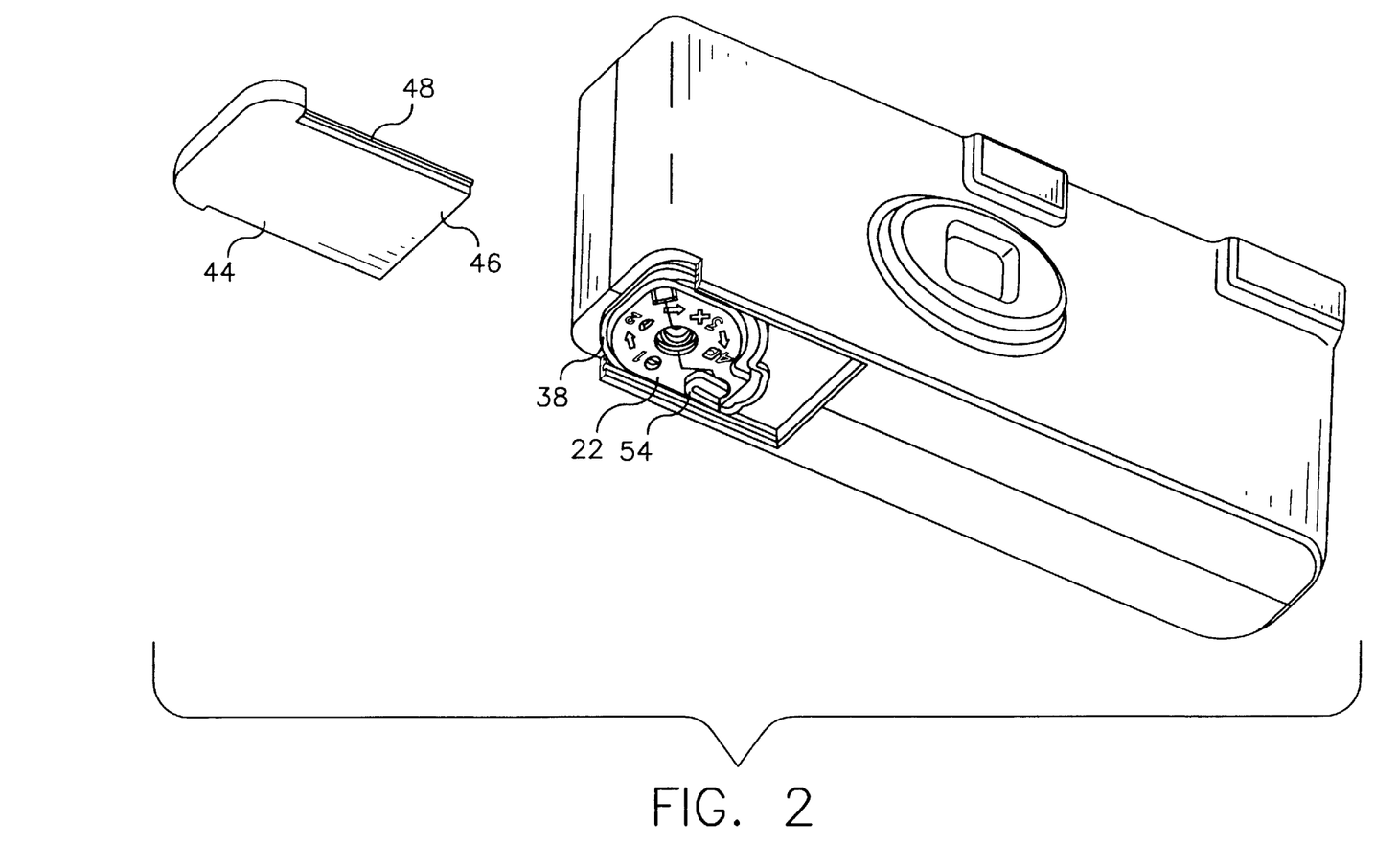
FIG. 2 is the same view as in FIG. 1, but the cartridge is loaded in the camera and the driver is installed with the key of the driver held by the active light lock of the cartridge.
Figure 3:
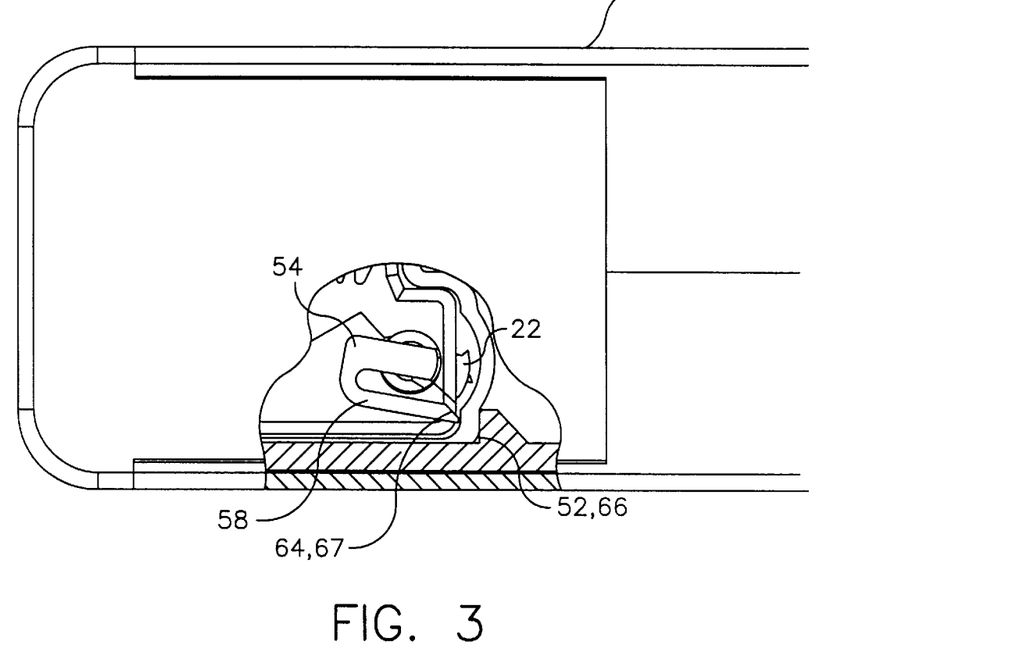
FIG. 3 is a partially cut-away bottom plan view of the camera of FIG. 1. The door is in a closed position, the active light lock is in a open state.
Figure 4:
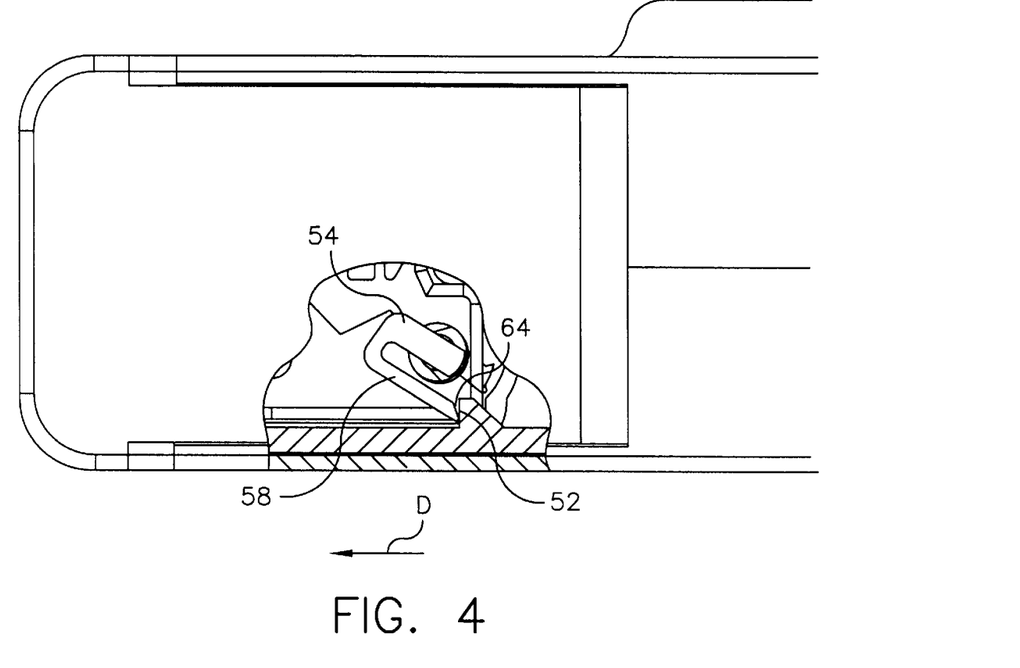
FIG. 4 is the same view as FIG. 3, but the door has been moved in the direction of arrow "A" from the closed position to a position between the closed position and a locking position. The active light lock and driver are likewise in intermediate positions.

The camera 10 of the invention has a body 12 that has a film cartridge chamber 14. Other camera 10 features such as the exposure system 16, viewfinder 18, and flash unit 20 shown in FIG. 1 are well known in the art and can be varied as desired. The camera 10 can be one-time use or reusable. One-time use is preferred, since the driver 54, discussed in detail below, is most easily provided as a separate part, which would make user film loading cumbersome. As is the case with other one-time use cameras, it is preferred that the film be prewound from the cartridge 22 prior to use, to simplify film transport.

The film cartridge 22 that the camera 10 uses has an active light lock 24. APS™ film is currently preferred. The active light lock 24 is movable from an open state to a closed state. In an APS cartridge 22, the light lock 24 is rotated for opening and closing. Other types of movement, for appropriate film cartridges, are within the scope of the invention.

The camera 10 has a closure 26 that includes a frame 28 that adjoins the film cartridge chamber 14. The frame 28 can be a separate unit or can be continuous with the rest of the camera body 12. The frame 28 defines a passage 30 for the cartridge 22 into the chamber 14 and defines rotational positions of the active light lock 24 in the open and closed states. The frame 28 has an outer rim 32 and an inner rim 34. The inner rim 34 adjoins the passage 30. The frame 28 is roughly rectangular and has a pair of opposed tracks 36 on two of the sides of the frame 28. In the embodiment shown in the figures, the two rims 32,34 are close to together on those two sides. On a third side, the outer rim 32 is recessed and a curb portion 38 of the inner rim 34 is shaped to provide a first portion 39 of an end light lock 40. On the fourth side, the two rims 32,34 are spaced apart by a light-blocking bulkhead 42.

Figure 12:
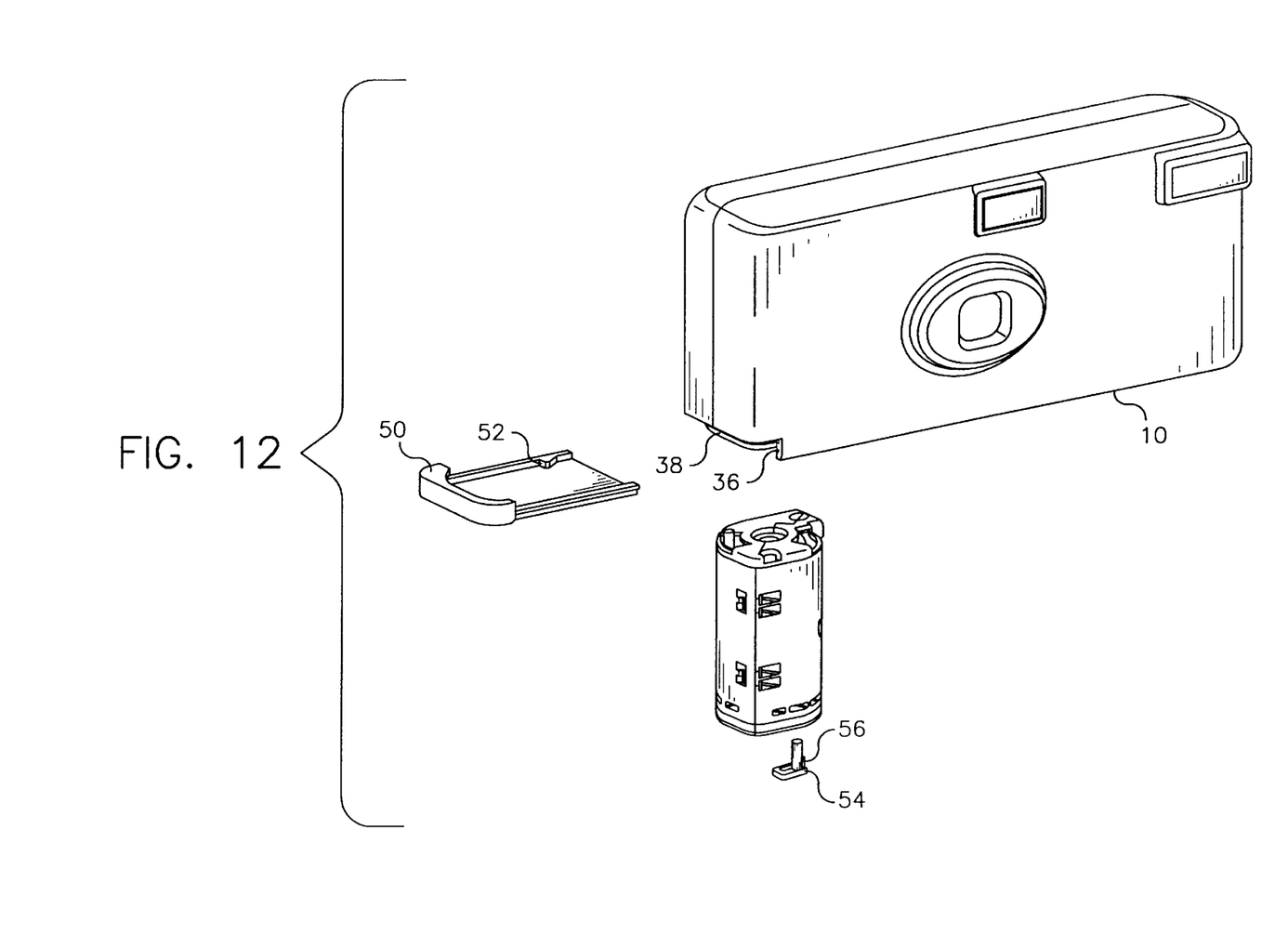
FIG. 12 is a top perspective view of the camera of FIG. 1.

The closure 26 has a door 44 that has about the same dimensions as the outer rim 32 of the track 36. The door 44 has a flat panel 46 and a pair of opposed margins 48 that are in slideable engagement with the tracks 36 when the door 44 is in the frame 28. The door 44 has a brim 50, shown in FIG. 12, on an end that extends between the tracks 36. On the bottom of the door 44, spaced apart from the edges of the door 44 is an engagement member 52. The brim 50 is shaped to fit against the third side of the frame 28 and provide the other portion 41 of the end light-lock 40. The door 44 is slideable along the tracks 36 from a closed position, to an locking position, and then to an open position. In all of the positions, the margins 48 and tracks 36, where engaged, provide a light lock. When the door 44 is in the closed position, the curb portion 38 and brim 50 form a light lock on the third side and the door panel 46, outer rim 32, and bulkhead 42 form a light lock on the fourth side. In the locking position, the curb portion 38 and door panel 46 form a light lock on the third side and the door panel 46 and bulkhead 42 provide a light lock on the fourth side.

The closure 26 includes the driver 54 that has an active light lock key 56 that meshes with and is releaseably held by the active light lock 24 of the cartridge 22. The driver 54 is shown in the figures as a loose part, but can be attached to the camera 10 by a flexible stay (not shown) or the like. The driver 54 has a pivot member 58 that extends outward from the key 56. In the embodiments shown in the figures, the pivot member 58 is recurvate and is roughly U-shaped with a first arm 60 that joins the key 56 and a second arm 61 that has a contact portion 64 that touches the engagement member 52. The driver 54 is movable relative to the frame 28 between a first position in which the active light lock 24 and key 56 are in the open state and a second position in which the active light lock 24 and key 56 are in the closed state. In the embodiment shown in the figures, the movement of the driver 54 is a rotation about an axis of rotation of the active light lock 24, but movement of the driver 54 could be linear or some combination of movements depending upon the configuration of the active light lock 24 of the film cartridge 22.

Figure 5:
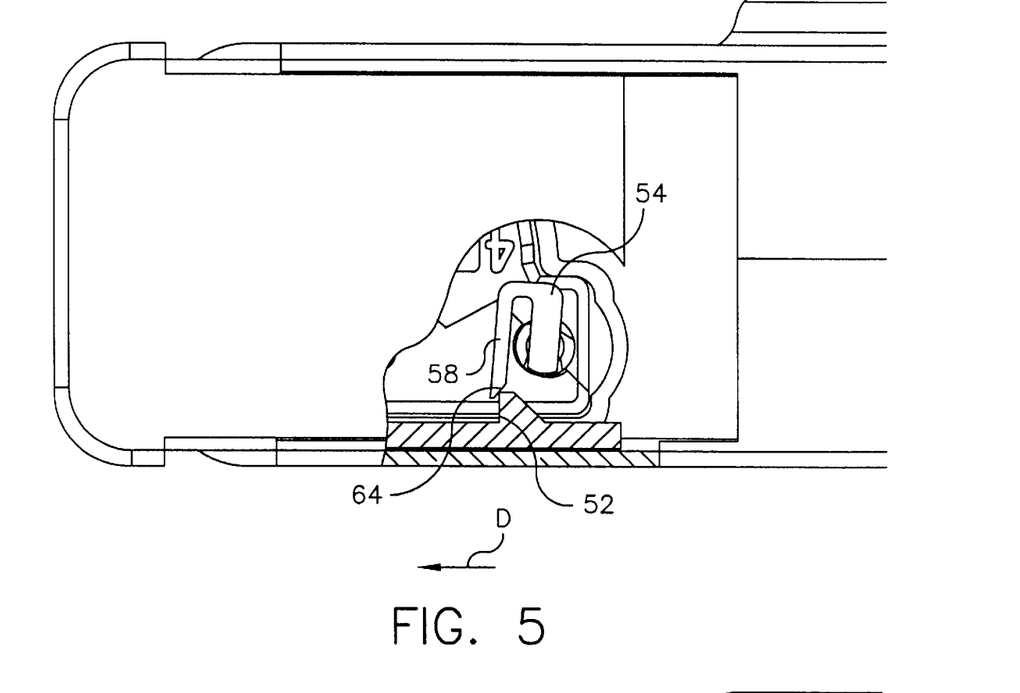
FIG. 5 is the same view as FIG. 4, but the door is has been moved further in the direction of arrow "A" into the a locking position. The active light lock is in a closed state.
Figure 6:
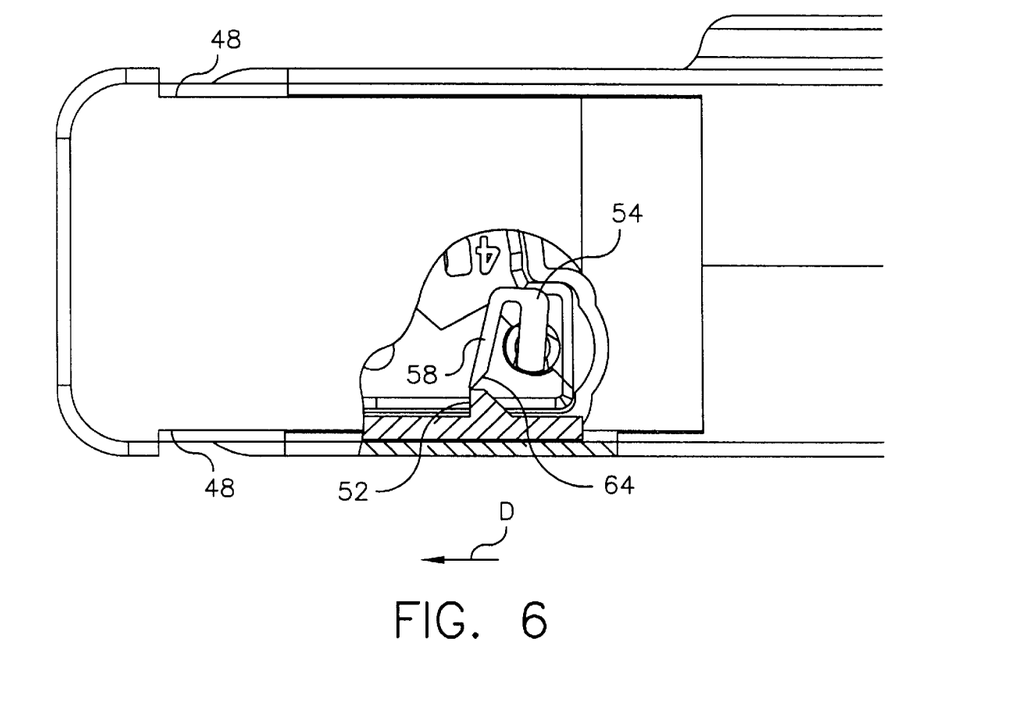
FIG. 6 is the same view as FIG. 5, but the door has been moved further in the direction of arrow "A" from the locking position into an intermediate position between the locking position and the open position. The active light lock is in the closed state. The pivot arm of the driver is flexed outward from the active light lock key by the engagement member of the door.
Figure 7:
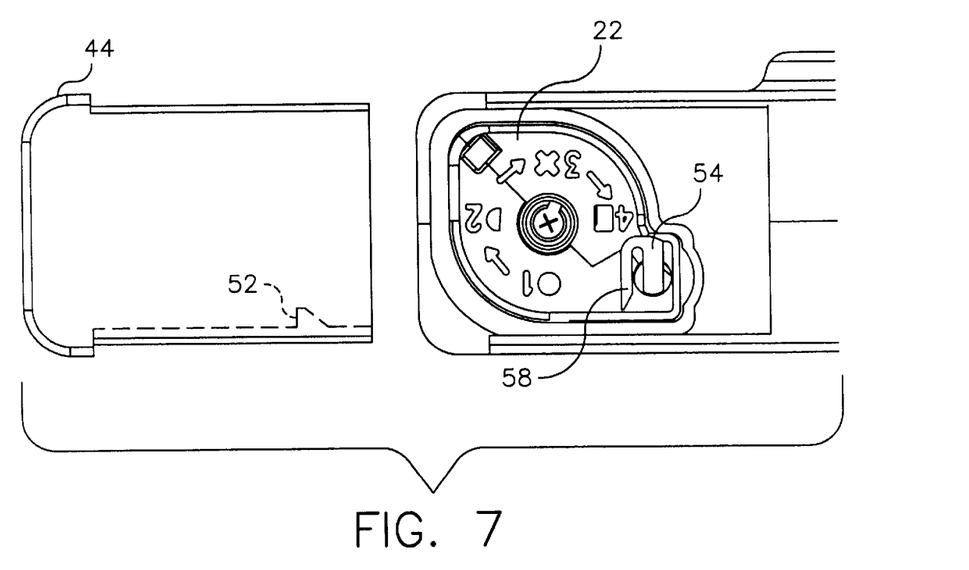
FIG. 7 is the same view as FIG. 6, but the door has been moved into the open position.
Figure 8:
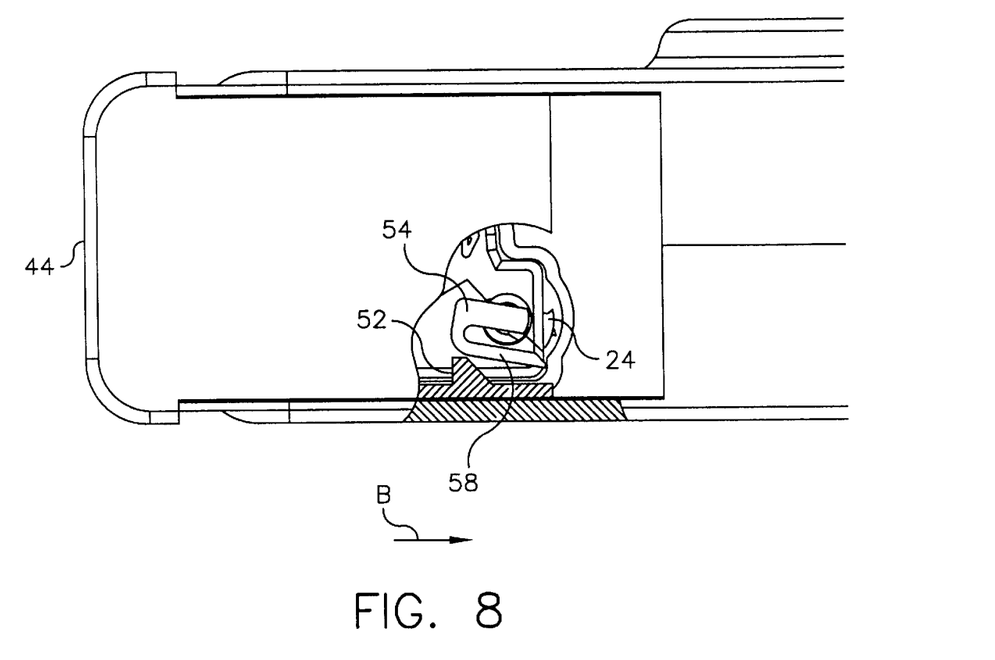
FIG. 8 is the same view as FIG. 7, but after the door has been reinserted and moved in the direction of arrow "B" from the open position and into the locking position.
Figure 9:
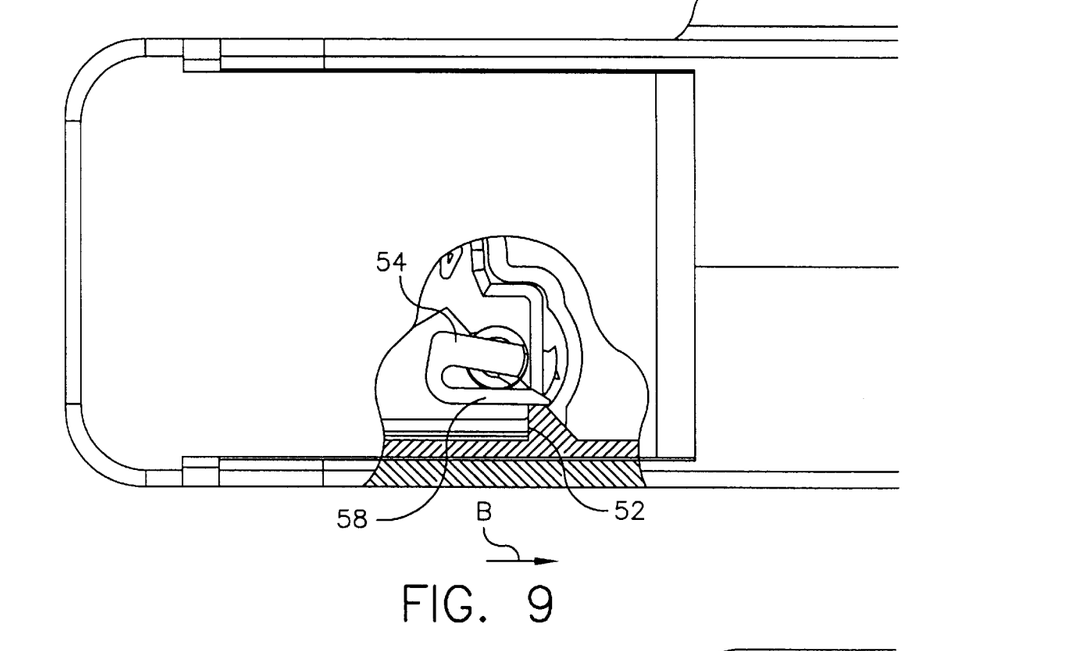
FIG. 9 is the same view as FIG. 8, with the door moved in the direction of arrow "B" from the locking position into an intermediate position between the locking position and closed position.
Figure 10:
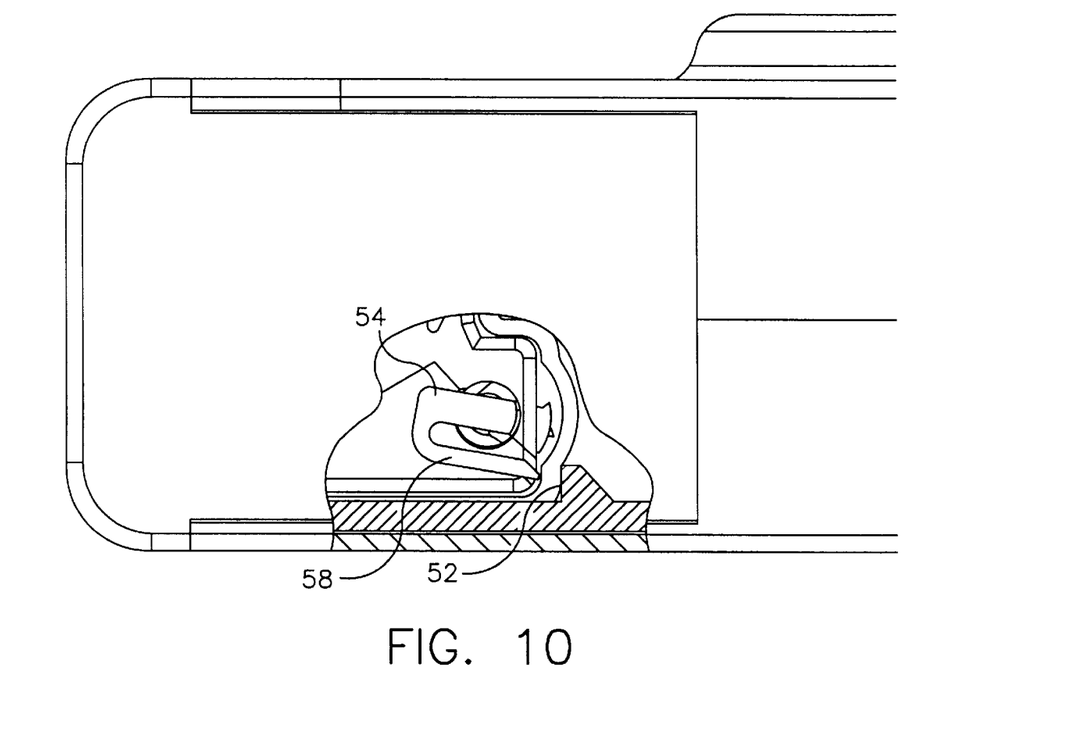
FIG. 10 is the same view as FIG. 9, with the door in the closed position.
Figure 11:
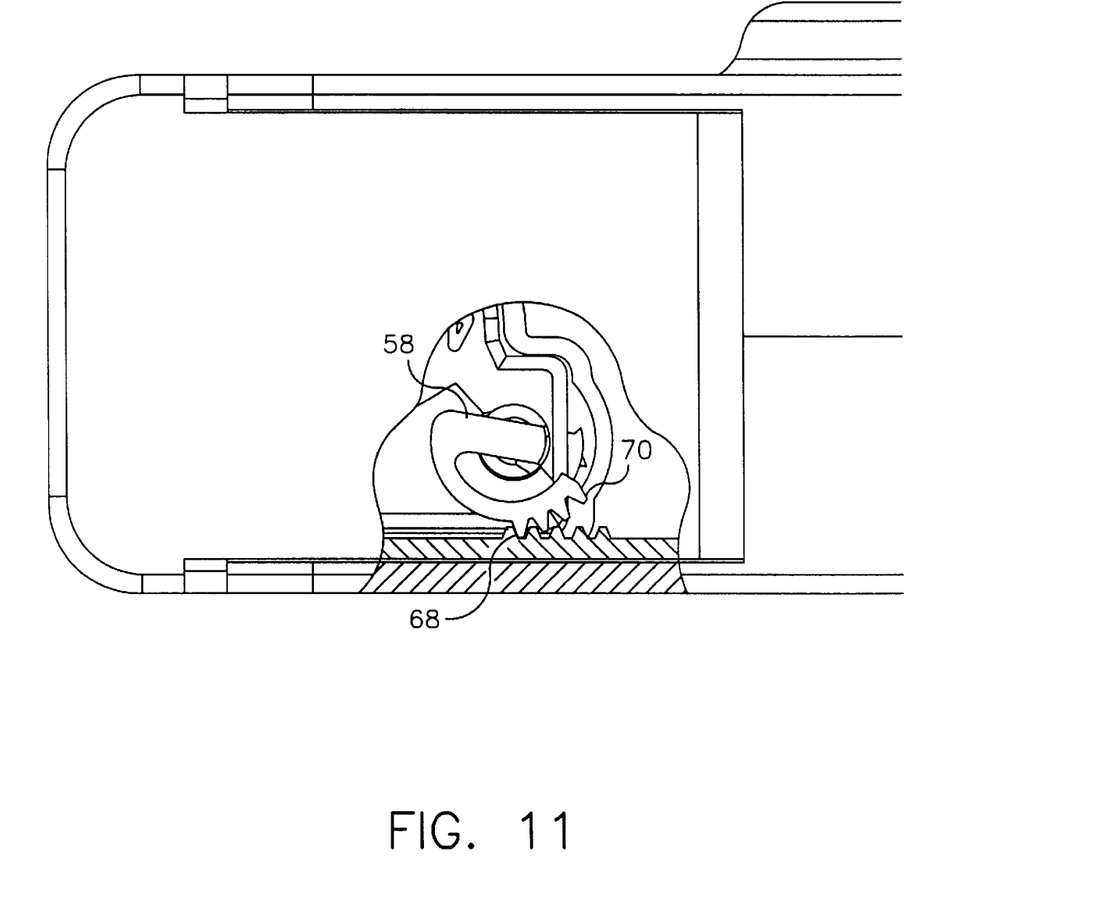
FIG. 11 is partially cut-away bottom plan view of another embodiment of the camera. The door is in the closed position.

The pivot member 58 and engagement member 52 mechanically engage the door 44 and the driver 54 during door 44 opening and closing. A variety of mechanism can be used for this purpose. The embodiments shown in the figures provide mechanical engagement by reciprocal teeth 66,67 on the engagement member 52 and pivot member 58, respectively. In the embodiment shown in FIGS. 1–10 and 12, the engagement member 52 and pivot member 58 each have a single tooth 66,67. In the embodiment shown in FIG. 11, the engagement member 52 is a toothed rack 68 and the pivot member 58 is a reciprocally toothed sector 70. Referring to FIGS. 3–7, the engagement member 52 and driver 54 coact to move the driver 54, in the direction of arrow "A", from a first position, shown in FIG. 3, to a second position, shown in FIG. 5, when the door 44 is slid from the closed position to the locking position. The active light lock 24 is in the open state when the driver 54 is in the first position. The active light lock 24 is in the closed state when the driver 54 is in the second position. Referring to FIGS. 5–6, the driver 54 remains in the second position when the door 44 is moved, in the direction of arrow "A", from the locking position to the open position. The driver 54 also disengages from the engagement member 52 when the door 44 is moved from the locking position to the open position. Free play is provided to allow the engagement member 52 to move past the driver 54. In the embodiments shown in the figures, the free play results from resilience of the driver 54, which allows the contact portion 64 to be bent aside to release the door 44, as shown in FIG. 6. Referring to FIGS. 8–10, the door 44 is reinserted and moved in the direction of arrow "B". The engagement member 52 moves the driver 54 into the first position, if necessary, and then retains the driver 54 in the first position until the door 44 reaches the closed position, as shown in FIG. 10. The contact portion 64 is resiliently bent toward the key 56 during this process, to allow the engagement member 52 to clear. The invention has been described in detail with particular reference to certain preferred embodiments thereof, but it will be understood that variations and modifications can be effected within the spirit and scope of the invention.

What is claimed is:

1. A closure for use with a film cartridge having an active light lock movable from an open state to a closed state, said closure comprising:

a frame having a pair of opposed tracks, said frame defining a passage for said cartridge;

a door having a pair of opposed margins in slideable engagement with said tracks, said door sliding along said tracks from a closed position, to an locking position, and from said locking position to an open position;

a driver having an active light lock key, said driver being movable relative to said frame from a first position wherein said key is disposed to hold the active light lock in the open state and a second position wherein said key is disposed to hold the active light lock in the closed state, wherein said sliding of said door from said closed position to said locking position moves said driver from said first position to said second position, and said sliding of said door from said locking position to said open position retains said driver in said second position.

2. The closure of claim 1 wherein said door and said frame are disposed in light-locking relation when said door is disposed in said closed and locking positions.

3. The closure of claim 1 further comprising a pivot arm extending outward from said key and an engagement member joined to said door, said pivot arm and said engagement member mechanically engaging said door to said driver when said door is in said locking position.

4. The closure of claim 3 wherein said engagement member is a rack and said pivot arm is a reciprocally toothed sector.

5. The closure of claim 3 wherein said pivot arm is resiliently biased against disengagement from said engagement member.

6. The closure of claim 3 wherein said engagement member is a single tooth and said pivot arm is a single tooth.

7. The closure of claim 6 wherein said pivot arm is recurvate.

8. The closure of claim 3 wherein said pivot arm is recurvate.

9. A camera comprising:

a film cartridge having an active light lock movable from an open state to a closed state;

a body having a film cartridge chamber holding said film cartridge and a frame adjoining said film cartridge chamber, said frame having a pair of opposed tracks, said frame defining a passage for said cartridge;

a door having a pair of opposed margins in slideable engagement with said tracks, said door sliding along said tracks from a closed position, to an locking position, and from said locking position to an open position;

a driver having an active light lock key releaseably held by said active light lock, said driver being movable relative to said frame from a first position wherein said key holds said active light lock in said open state and a second position wherein said key holds said active light lock in said closed state, wherein said sliding of said door from said closed position to said locking position moves said driver from said first position to said second position, and said sliding of said door from said locking position to said open position retains said driver in said second position.

10. The closure of claim 9 wherein said door and said frame are disposed in light-locking relation when said door is disposed in said closed and locking positions.

11. The closure of claim 9 further comprising a pivot arm extending outward from said key and an engagement member joined to said door, said pivot arm and said engagement member mechanically engaging said door to said driver when said door is in said locking position.

12. The closure of claim 11 wherein said engagement member is a rack and said pivot arm is a reciprocally toothed sector.

13. The closure of claim 11 wherein said pivot arm is resiliently biased against disengagement from said engagement member.

14. The closure of claim 11 wherein said engagement member is a single tooth and said pivot arm is a single tooth.

15. The closure of claim 14 wherein said pivot arm is recurvate.

16. The closure of claim 11 wherein said pivot arm is recurvate.

* * * * *